United States Patent
Sugihara et al.

(10) Patent No.: US 9,779,549 B2
(45) Date of Patent: Oct. 3, 2017

(54) INFORMATION PRESENTATION SYSTEM AND METHOD FOR CONTROLLING INFORMATION PRESENTATION SYSTEM

(71) Applicant: OLYMPUS CORPORATION, Tokyo (JP)

(72) Inventors: Ryohei Sugihara, Machida (JP); Seiji Tatsuta, Hachioji (JP); Teruo Tomita, Fuchu (JP)

(73) Assignee: OLYMPUS CORPORATION, Tokyo (JP)

( * ) Notice: Subject to any disclaimer, the term of this patent is extended or adjusted under 35 U.S.C. 154(b) by 64 days.

(21) Appl. No.: 14/317,760

(22) Filed: Jun. 27, 2014

(65) Prior Publication Data
US 2015/0002544 A1    Jan. 1, 2015

(30) Foreign Application Priority Data

Jun. 28, 2013   (JP) ................................ 2013-135958

(51) Int. Cl.
*G02B 27/01*   (2006.01)
*G06T 19/00*   (2011.01)
*G06K 9/00*   (2006.01)

(52) U.S. Cl.
CPC .......... *G06T 19/006* (2013.01); *G02B 27/017* (2013.01); *G06K 9/00671* (2013.01);
(Continued)

(58) Field of Classification Search
CPC .. G06F 3/0481; G06F 3/04817; G06F 9/4443; G06F 3/04847; G06F 11/3664;
(Continued)

(56) References Cited

U.S. PATENT DOCUMENTS

| | | | |
|---|---|---|---|
| 7,796,155 B1* | 9/2010 | Neely, III | .......... G06K 9/00771 345/418 |
| 2008/0030461 A1* | 2/2008 | Matsui | .................... G06F 3/011 345/156 |

(Continued)

FOREIGN PATENT DOCUMENTS

| | | | |
|---|---|---|---|
| JP | 2000-207487 A | | 7/2000 |
| JP | 2006-309314 A | | 11/2006 |

(Continued)

OTHER PUBLICATIONS

Japanese Office Action dated Feb. 28, 2017 in Japanese Patent Application No. 2013-135958.

*Primary Examiner* — Todd Buttram
(74) *Attorney, Agent, or Firm* — Scully, Scott, Murphy & Presser, P.C.

(57) ABSTRACT

An information presentation system includes: a display that displays an image as a virtual image so that the image can be observed by the user, and a display control section that causes the display to display information based on a captured image acquired from an imaging section, the imaging section being equipped to the head of the user and capturing a range in the direction of the field of view of the user, when an object recognition range is set to part of an imaging range of the imaging section, the display displaying the virtual image in a virtual image display range, the virtual image display range having such a positional relationship with the object recognition range that at least part of the virtual image display range in which the virtual image is displayed overlaps part of the object recognition range.

25 Claims, 13 Drawing Sheets

(52) U.S. Cl.
CPC ............ *G02B 2027/014* (2013.01); *G02B 2027/0138* (2013.01); *G02B 2027/0141* (2013.01); *G02B 2027/0178* (2013.01)

(58) Field of Classification Search
CPC ........ G06F 3/011; G06F 3/012; G06F 3/0304; G06T 19/00; G06T 17/00; G06T 19/006; H04N 5/272; A63F 13/10
See application file for complete search history.

(56) References Cited

U.S. PATENT DOCUMENTS

| | | | | |
|---|---|---|---|---|
| 2011/0199636 | A1* | 8/2011 | Katsuda | G03B 21/26 358/1.15 |
| 2012/0032877 | A1* | 2/2012 | Watkins, Jr. | G06F 1/1624 345/156 |
| 2012/0182313 | A1* | 7/2012 | Ahn | G06T 19/00 345/633 |
| 2013/0260360 | A1* | 10/2013 | Baurmann | G06F 3/14 434/365 |
| 2014/0028716 | A1* | 1/2014 | Yeh | G06T 19/006 345/633 |
| 2014/0198129 | A1* | 7/2014 | Liu | G06F 3/04815 345/633 |
| 2014/0285519 | A1* | 9/2014 | Uusitalo | G06T 19/006 345/633 |
| 2014/0300634 | A1* | 10/2014 | Cho | G06T 19/006 345/633 |

FOREIGN PATENT DOCUMENTS

| | | |
|---|---|---|
| JP | 2010-067083 A | 3/2010 |
| JP | 2012-008290 A | 1/2012 |
| WO | 2012-001218 A1 | 1/2012 |

* cited by examiner

ACTUAL FIELD OF VIEW

MOUNT TANIGAWA BELONGS TO MIKUNI MOUNTAIN RANGE SITUATED AT BORDER BETWEEN GUNMA AND NIIGATA, AND IS ONE OF 100 FAMOUS MOUNTAINS IN JAPAN.

DA

INFORMATION PRESENTATION SYSTEM AND METHOD FOR CONTROLLING INFORMATION PRESENTATION SYSTEM

Japanese Patent Application No. 2013-135958 filed on Jun. 28, 2013, is hereby incorporated by reference in its entirety.

BACKGROUND

The present invention relates to an information presentation system, a method for controlling an information presentation system, and the like.

In recent years, a concept referred to as "Internet of Things (IoT)" has been widely known. The Internet of Things is based on the assumption that every "thing" that exists in a daily environment has information, and is connected through a network.

For example, every home appliance (e.g., refrigerator and air conditioner) installed in a home or an office is connected to a network (e.g., the Internet) as a smart home appliance, and transmits information. The term "thing" used in connection with the Internet of Things is not limited to an electronic device (e.g., home appliance), but may be a potted plant, a water tank, goods displayed on a store shelf, or the like.

In such a situation, it is advantageous to recognize a thing (recognition target or information acquisition target (hereinafter may be referred to as "object")) in some way, and display information about the recognized object.

For example, JP-A-2012-8290 discloses a system that presents information about an object recognized by an imaging device (camera) equipped to the head or the like of the user using a virtual image display device equipped to the head of the user.

SUMMARY

According to one aspect of the invention, there is provided an information presentation system comprising:

a display that displays an image within a field of view of a user as a virtual image so that the image can be observed by the user; and a display control section that causes the display to display information based on a captured image acquired from an imaging section, the imaging section being equipped to the head of the user and capturing a range in a direction of the field of view of the user, when an object recognition range is set to part of an imaging range of the imaging section, the object recognition range being a range in which an object is recognized, the display displaying the virtual image in a virtual image display range, the virtual image display range having such a positional relationship with the object recognition range that at least part of the virtual image display range in which the virtual image is displayed overlaps part of the object recognition range.

According to another aspect of the invention, there is provided a method for controlling an information presentation system that is configured so that an imaging section captures a range in a direction of a field of view of a user, and a display displays an image within the field of view of the user as a virtual image so that the image can be observed by the user, the image including information based on a captured image acquired from the imaging section, when an object recognition range is set to part of an imaging range of the imaging section, the object recognition range being a range in which an object is recognized, the method comprising:

displaying the virtual image in a virtual image display range, the virtual image display range having such a positional relationship with the object recognition range that at least part of the virtual image display range in which the virtual image is displayed overlaps part of the object recognition range.

DESCRIPTION OF EXEMPLARY EMBODIMENTS

Figure 1:
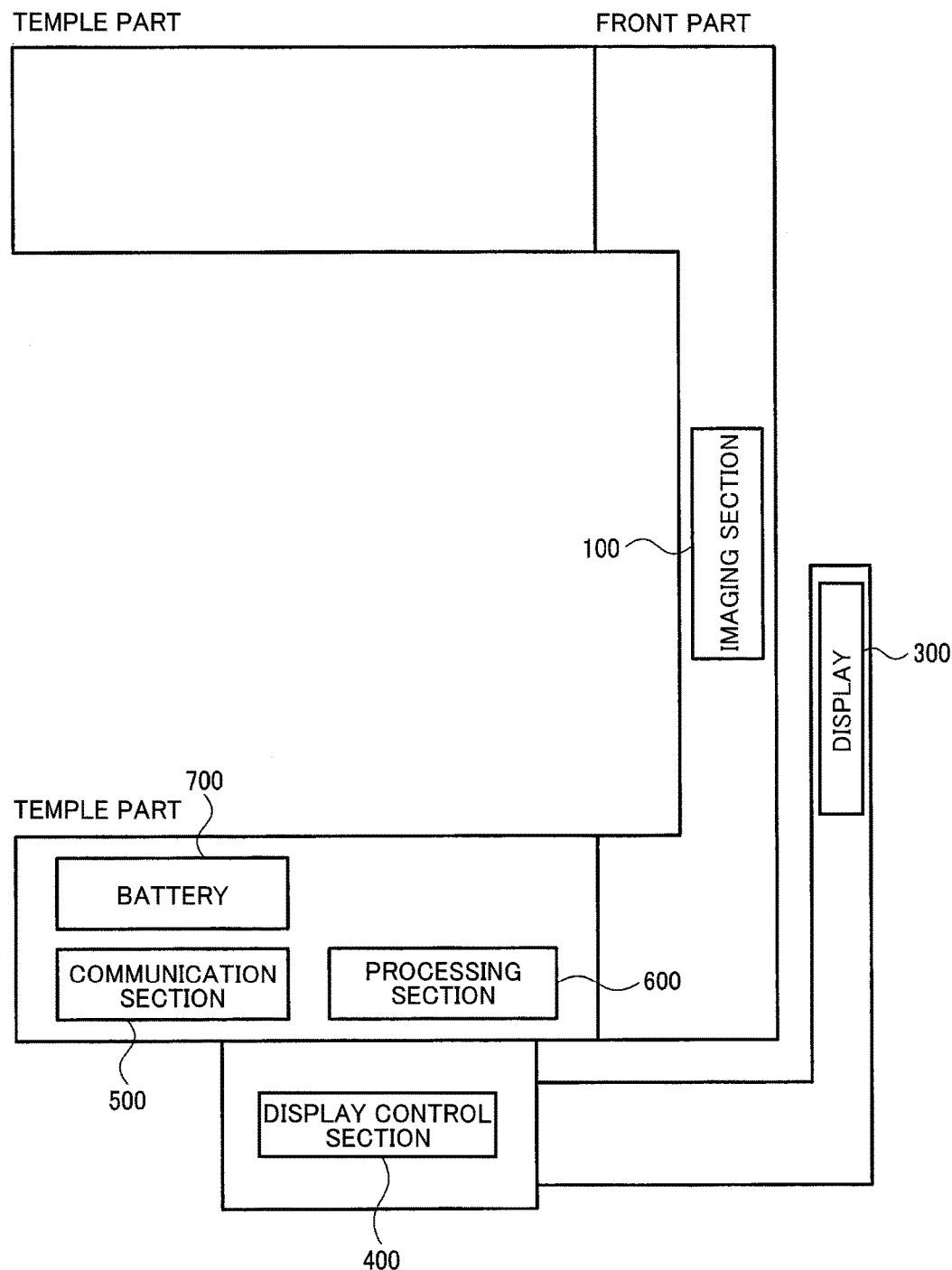
FIG. 1 illustrates a system configuration example of an information presentation system according to one embodiment of the invention.

According to one embodiment of the invention, there is provided an information presentation system comprising:

a display that displays an image within a field of view of a user as a virtual image so that the image can be observed by the user; and a display control section that causes the display to display information based on a captured image acquired from an imaging section, the imaging section being equipped to the head of the user and capturing a range in a direction of the field of view of the user, when an object recognition range is set to part of an imaging range of the imaging section, the object recognition range being a range in which an object is recognized, the display displaying the virtual image in a virtual image display range, the virtual image display range having such a positional relationship with the object recognition range that at least part of the virtual image display range in which the virtual image is displayed overlaps part of the object recognition range.

According to one embodiment of the invention, the display displays the virtual image in the virtual image display range having such a positional relationship with the object recognition range that at least part of the virtual image display range overlaps part of the object recognition range. It is possible to notify the user of the position or the like of the object recognition range by utilizing an area in which the object recognition range and the virtual image display range overlap each other. Since the recognition target object is not screened by an image in an area of the object recognition range that does not overlap the virtual image display range, a deterioration in visibility can be suppressed, for example.

In the information presentation system, when an area of the virtual image display range that overlaps part of the object recognition range is a first area, and an area of the virtual image display range that does not overlap the object recognition range is a second area, the display may display information about the object recognized based on the object recognition range in an area of the image that corresponds to the second area.

According to this configuration, since the recognition target object is not screened by an image displayed in the second area (at least an area of the object that affects the recognition process to a large extent is not screened by an image), it is possible to suppress a deterioration in the visibility of the object by utilizing the second area for displaying information, for example.

In the information presentation system, the display may display a marker in the virtual image display range, the marker notifying the user of the positional relationship between the object recognition range and the virtual image display range.

This makes it possible to comprehensibly notify the user of the positional relationship between the object recognition range and the virtual image display range utilizing the marker, for example.

In the information presentation system, the display may display a center position marker in the virtual image display range as the marker, the center position marker indicating a center position of the object recognition range.

This makes it possible to comprehensibly notify the user of the positional relationship between the object recognition range and the virtual image display range utilizing the center position marker, for example.

In the information presentation system, the display may display the center position marker that indicates the center position of the object recognition range in a peripheral area of the virtual image display range as the marker.

This makes it possible to appropriately determine the display position of the center position marker, for example.

In the information presentation system, the display may display a frame marker in the virtual image display range as the marker, the frame marker indicating part of a frame of the object recognition range.

This makes it possible to comprehensibly notify the user of the positional relationship between the object recognition range and the virtual image display range utilizing the frame marker, for example.

In the information presentation system, when the object recognition range is set along one side of the virtual image display range, the display may display a line marker in the virtual image display range as the marker, the line marker extending linearly, and indicating a position of the object recognition range.

This makes it possible to comprehensibly notify the user of the positional relationship between the object recognition range and the virtual image display range utilizing the line marker, for example.

The information presentation system may further comprise:

a processing section that sets the object recognition range, and the processing section may set the object recognition range based on information that indicates a position of the virtual image display range so that the object recognition range has such a positional relationship with the virtual image display range that at least part of the virtual image display range overlaps part of the object recognition range.

This makes it possible to set the object recognition range taking account of the positional relationship between the object recognition range and the virtual image display range, for example.

In the information presentation system, the processing section may variably set at least one of a position and a size of the object recognition range.

This makes it possible to flexibly set the object recognition range, for example.

In the information presentation system, the processing section may set the size of the object recognition range to be smaller than the size of the object recognition range during a recognition process when a number of the objects recognized by the recognition process performed on the object recognition range is larger than a given threshold value.

This makes it possible to change the size of the object recognition range based on the results of the recognition process, for example.

In the information presentation system, when the object is a text, the display may display information relating to the text recognized as the object, or information obtained by translating the text in the virtual image display range.

This makes it possible to recognize a text as the object, for example.

In the information presentation system, the display may display the virtual image in the virtual image display range having the positional relationship in which part of the virtual image display range overlaps part of the object recognition range.

This makes it possible to implement a positional relationship in which part of the virtual image display range overlaps part of the object recognition range, for example.

In the information presentation system, the display may display the virtual image in the virtual image display range having the positional relationship in which entirety of the virtual image display range overlaps part of the object recognition range.

This makes it possible to implement a positional relationship in which the entirety of the virtual image display range overlaps part of the object recognition range, for example.

In the information presentation system, when an area in which the object recognition range and the virtual image display range overlap each other is an overlapping area, and an area of the object recognition range that does not overlap the virtual image display range is a non-overlapping area, the display may display the virtual image in the virtual image display range having the positional relationship in which both the overlapping area and the non-overlapping area are present.

This makes it possible to display an image in the virtual image display range having a positional relationship with the object recognition range that is specified from the viewpoint of the overlapping area and the non-overlapping area, for example.

According to another embodiment of the invention, there is provided a method for controlling an information presentation system that is configured so that an imaging section captures a range in a direction of a field of view of a user, and a display displays an image within the field of view of the user as a virtual image so that the image can be observed by the user, the image including information based on a captured image acquired from the imaging section, when an object recognition range is set to part of an imaging range of the imaging section, the object recognition range being a range in which an object is recognized, the method comprising:

displaying the virtual image in a virtual image display range, the virtual image display range having such a positional relationship with the object recognition range that at least part of the virtual image display range in which the virtual image is displayed overlaps part of the object recognition range.

Exemplary embodiments of the invention are described below. Note that the following exemplary embodiments do not in any way limit the scope of the invention laid out in the claims. Note also that all of the elements described in connection with the following exemplary embodiments should not necessarily be taken as essential elements of the invention.

1. METHOD

A method used in connection with several exemplary embodiments of the invention is described below. The Internet of Things is based on the assumption that every "thing" that exists in a daily environment has information, and is connected through a network. Each "thing (object)" transmits information through the network, and each user acquires and browses the information.

Figure 13:
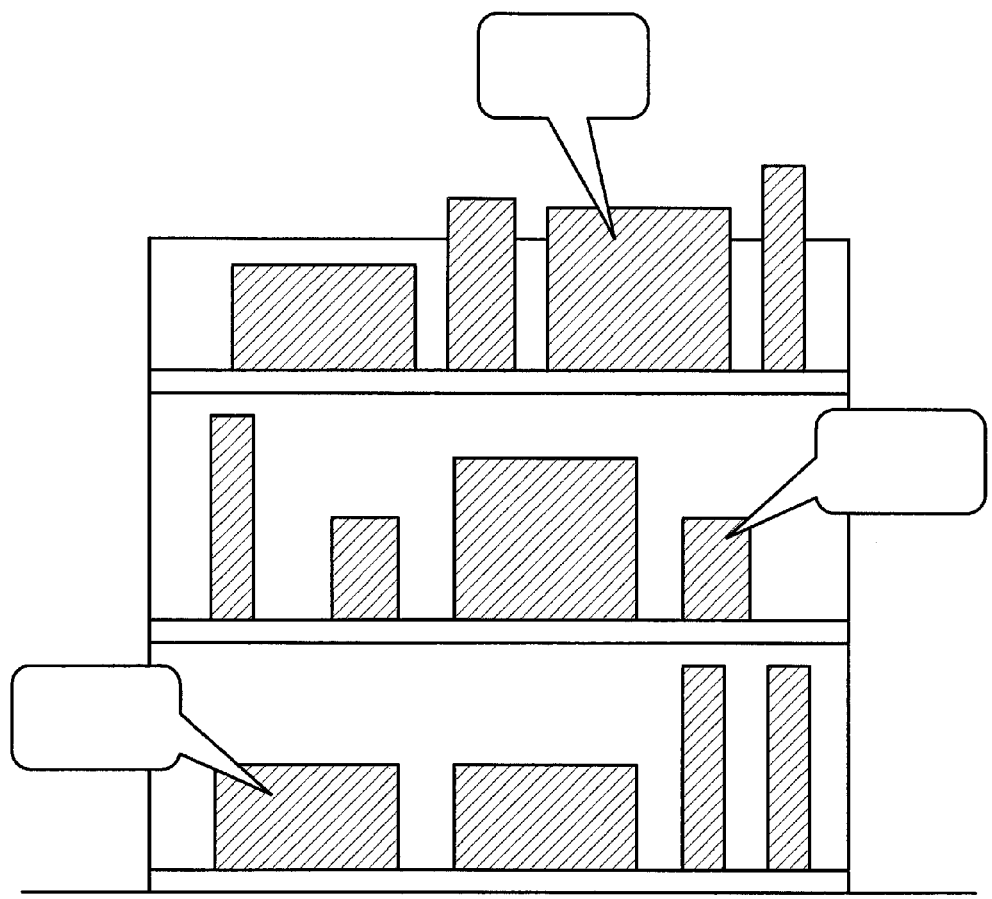
FIG. 13 is a view illustrating the Internet of Things.

The object may be a smart home appliance, a potted plant, a water tank, goods displayed on a goods shelf (see FIG. 13), or the like. The object may transmit information in various ways. For example, each home appliance may utilize a social networking service (SNS). For example, each home appliance may post information to each user by utilizing a microblogging service. More specifically, a refrigerator may notify the user of the refrigerator of the amount, the condition, and the like of food stored therein. Note that the balloons in FIG. 13 represent the concept of the Internet of Things (i.e., each items of goods transmits information). Information may be presented to the user in the form of a balloon utilizing augmented reality or the like. Note that the embodiments of the invention are not limited to such a technique.

A thing (object) (e.g., potted plant or water tank) that is not an electronic device, and does not have a communication function may be provided with a small electronic device that includes a sensor and a communication section. Alternatively, information about each object may be managed by a server or the like, and a device possessed by each user (e.g., a user who takes care of a potted plant, or a user who has purchased goods) may recognize the object, and request the server to send the desired information.

In such a situation, useless information may also be acquired when all of the information on the network is acquired, and it is not realistic to acquire all of the information on the network taking account of the amount of information. Therefore, a sensing process may be performed using a sensor, and the information about the object subjected to the sensing process may be acquired and displayed. For example, JP-A-2012-8290 discloses a system that presents information about an object recognized by an imaging device (camera) equipped to the head or the like of the user using a virtual image display device equipped to the head of the user.

Figure 14A:
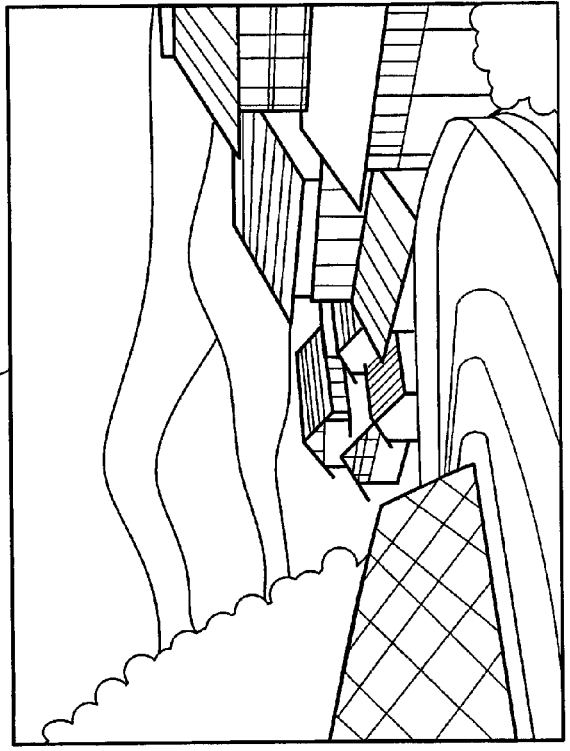
FIGS. 14A and 14B are views illustrating an external field of view and a virtual image display range.

The virtual image display device is a see-through head-mounted display (HMD) or the like. The see-through HMD displays an image in a virtual image display range as a virtual image, the virtual image display range being part of the external field of view (actual field of view) of the user. For example, when the actual field of view of the user is as illustrated in FIG. 14A, the see-through HMD displays an image in a virtual image display range DA (see FIG. 14B) within the actual field of view of the user.

Figure 14B:
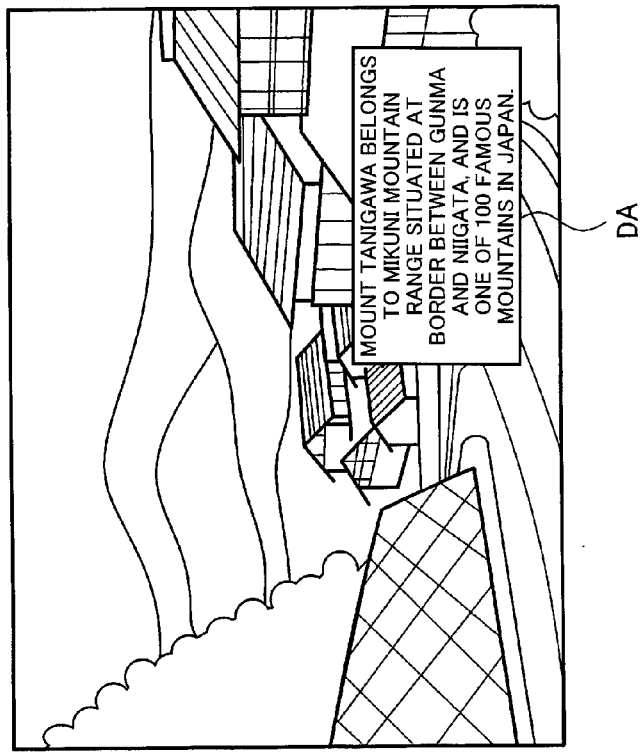

A system according to several embodiments of the invention is designed to achieve the situation illustrated in FIG. 14B. Specifically, a mountain observed within the external field of view is recognized using a captured image acquired from an imaging section, and information about the mountain is displayed in the virtual image display range DA based on the recognition results. When the imaging range of the imaging section is linked to the direction of the field of view of the user, the user can acquire information about the desired object from the image displayed in the virtual image display range DA by looking at the object.

In this case, it is necessary to take account of the relationship between the object recognition range (that is subjected to the object recognition process using the captured image) and the virtual image display range (see DA in FIG. 14B). For example, when the imaging section captures a range almost equal to the actual field of view of the user illustrated in FIGS. 14A and 14B, a number of objects (e.g., house, road, and tree) are included in the captured image in addition to the mountain, and it is difficult to determine the object about which the information should be presented to the user. It is desirable to link the direction of the field of view and the imaging range taking account of convenience to the user. However, it is not necessarily desirable to set the entire captured image (corresponding to the maximum detection range MAX in FIG. 3, for example) to be the object recognition range.

Specifically, it is desirable to set the object recognition range to have such a size that the number of objects included in the object recognition range is one, or such a small number that no problem occurs when displaying information. For example, it is desirable to subject only part of the captured image to the recognition process. Specifically, it is desirable to set only part of the imaging range (e.g., the maximum detection range MAX in FIG. 3) to be the object recognition range.

However, when the object recognition range is narrower than the actual field of view or the like, a problem may occur when notifying the user of the position and the size of the object recognition range.

For example, when the object recognition range and the virtual image display range have such a positional relationship that the object recognition range and the virtual image display range do not overlap each other, the user is not notified of information about the position and the size of the object recognition range. For example, a marker that indicates the object recognition range may be displayed to deal with such a situation. However, since an image can be displayed only in the virtual image display range DA, it is difficult to comprehensibly display the position and the size of the object recognition range that does not overlap the virtual image display range DA. Since the imaging range of the imaging section corresponds to the direction of the field of view of the user, the user can estimate that the object recognition range is included within the actual field of view. In this case, however, it is difficult for the user to appropriately capture the desired object (i.e., information acquisition target object) within the object recognition range.

On the other hand, the user can easily determine the position and the size of the virtual image display range DA since an image is displayed in the virtual image display range DA. Specifically, it is possible to notify the user of the position of the object recognition range by causing the object recognition range to coincide with the virtual image display range DA, or causing the object recognition range to be included in the virtual image display range DA.

However, since information (image) is displayed in the virtual image display range DA (see FIG. 14B), the visibility of the object that is situated within the virtual image display range DA significantly deteriorates when information is displayed in the virtual image display range DA. For example, the visibility of the objects (e.g., road and house) within the actual field of view (see FIG. 14A) deteriorates due to an image displayed in the virtual image display range DA (see FIG. 14B). Therefore, when the object for which the user desires to acquire information is included in the virtual image display range DA, the visibility of the object in which the user is interested deteriorates.

In order to deal with the above problems, several aspects and embodiments of the invention propose an information presentation system and the like that comprehensibly notify the user of the position of the object recognition range taking account of the positional relationship between the object recognition range and the virtual image display range, and suppress a deterioration in the visibility of the object due to an image displayed in the virtual image display range even when the object is included in the object recognition range.

According to one embodiment of the invention, an information presentation system includes a display 300 that displays an image within the field of view of the user as a virtual image so that the image can be observed by the user, and a display control section 400 that causes the display 300 to display information based on the captured image acquired from an imaging section 100 that is equipped to the head of the user, and captures a range in the direction of the field of view of the user (see FIG. 1). When the object recognition range OB (i.e., a range in which the object is recognized) is set to part of the imaging range of the imaging section 100, the display 300 displays the virtual image in a virtual image display range, the virtual image display range having such a positional relationship with the object recognition range OB that at least part of the virtual image display range in which the virtual image is displayed overlaps part of the object recognition range OB.

Since the object recognition range and the virtual image display range have an overlapping area, it is possible to display a marker within the overlapping area of the virtual image display range, for example. This makes it possible to comprehensibly notify the user of the position and/or the size of the object recognition range. Since an area (non-overlapping area) in which the object recognition range and the virtual image display range do not overlap each other is also provided, it is possible to suppress a deterioration in the visibility of the object due to the displayed image while subjecting the object included in the object recognition range to the recognition process.

A system configuration example of the information presentation system, an example of the relationship between the object recognition range and the virtual image display range, a modification in which a text is recognized as the object, and a modification in which the position and/or the size of the object recognition range is variably set based on the object recognition results or the like are described below.

2. SYSTEM CONFIGURATION EXAMPLE

FIG. 1 illustrates a system configuration example of an information presentation system according to one embodiment of the invention. Although FIG. 1 illustrates an example in which an eyeglass-type wearable device (HMD) is used as the information presentation system, the information presentation system is not limited to an eyeglass-type wearable device.

FIG. 1 is a top view illustrating the eyeglass-type wearable device, wherein the temple parts are respectively equipped over the ears, and the front part corresponds to the part of normal eyeglass where lenses are provided. As illustrated in FIG. 1, the information presentation system includes an imaging section 100, a display 300, a display control section 400, a communication section 500, a processing section 600, and a battery 700. Note that the configuration of the information presentation system is not limited to the configuration illustrated in FIG. 1. Various modifications may be made, such as omitting some of the elements illustrated in FIG. 1, or adding other elements.

The imaging section 100 captures a range in the direction of the field of view of the user to acquire a captured image. The display 300 displays (superimposes) an image (virtual image) within the external field of view of the user. As illustrated in FIG. 1, a frame may be provided so that the end thereof is positioned in front of the eyeball of the user, and a display may be provided at the end of the frame to implement the display 300, for example. The display control section 400 controls display on the display 300.

The communication section 500 communicates with another electronic device through a network. For example, the communication section 500 receives object information from an object. When the imaging section and the processing section that performs a recognition process are provided in another device (see FIG. 2), the communication section 500 performs a communication process that receives information (e.g., captured image and recognition results) from the other device.

The processing section 600 performs various processes based on operation information based on an operation performed by the user, and information received by the communication section 500. The function of the processing section 600 may be implemented by hardware such as a processor (e.g., CPU) or an ASIC (e.g., gate array), a program, or the like. The processing section 600 may perform an object recognition range setting process, and an object recognition process based on the captured image output from the imaging section 100, for example.

The battery 700 supplies power for operating each section of the wearable device.

Although FIG. 1 illustrates an example in which the information presentation system (wearable device in a narrow sense) includes the imaging section 100, the configuration is not limited thereto. Since the imaging range of the imaging section corresponds to the direction of the field of view of the user, the imaging section may be included in another wearable device that is equipped to the head of the user. For example, the user may wear a headband-type wearable device, a helmet-type wearable device, an earclip-type wearable device, or the like in addition to the information presentation system, and the imaging section may be included in the wearable device. In this case, the information presentation system and the wearable device that includes the imaging section may be connected through a network, an image captured by the imaging section may be transmitted to the communication section 500 included in the information presentation system through the network, and the processing section 600 may perform the recognition process on the captured image. The network may be a cable network, or may be a wireless network. A unit that includes the imaging section may be provided as an attachment for the information presentation system. In this case, the unit that includes the imaging section is connected to an interface (e.g., terminal) provided to the information presentation system.

Although an example in which the processing section 600 included in the information presentation system performs the object recognition range setting process and the captured image recognition process has been described above, the configuration is not limited thereto. When the information presentation system is a wearable device, it is preferable that the wearable device have a reduced size and a reduced weight since the wearable device is worn by the user. Therefore, the processing performance of the processing section 600, the battery capacity, and the like may be limited, and it may be difficult for the information presentation system to perform the recognition process (image processing) that imposes a high processing load. In this case, the recognition process may be performed by an external device, and the information presentation system may acquire and display the processing results.

Figure 2:
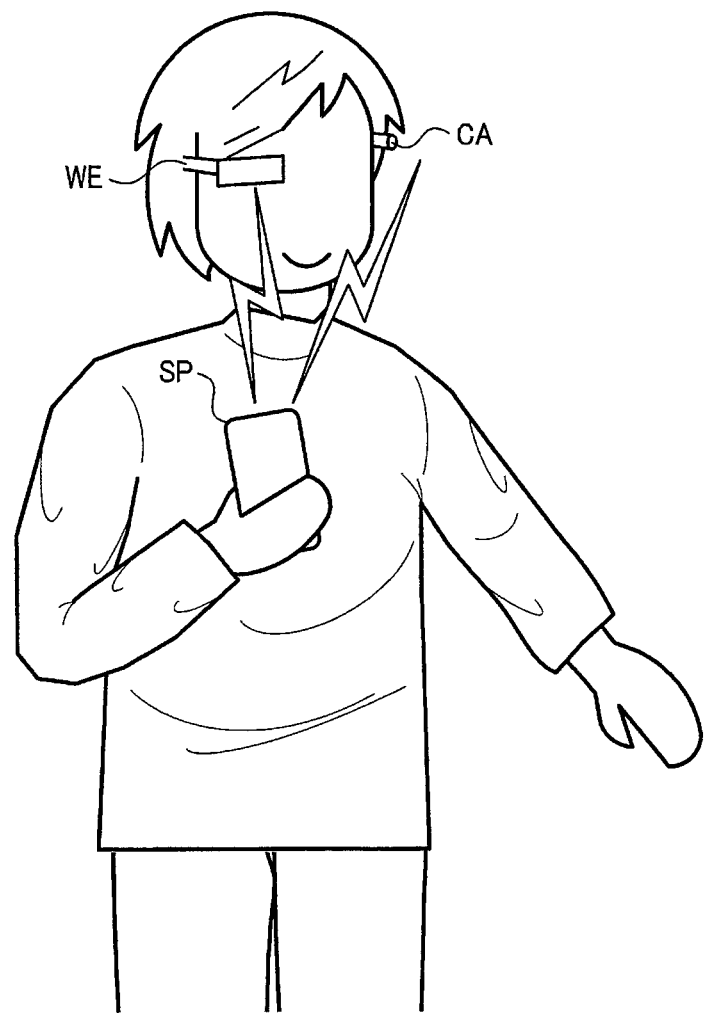
FIG. 2 illustrates an example in which a wearable device that functions as an information presentation system is provided separately from an imaging section and a processing section.

In the example illustrated in FIG. 2, the information presentation system (wearable device WE) and another wearable device that includes an imaging section CA are provided separately, and the user wears the wearable device WE and the imaging section CA, and carries still another electronic device (smartphone SP). In the example illustrated in FIG. 2, the captured image is transmitted from the imaging section CA to the smartphone SP through a network (e.g., short-range wirelesses network), and a processing section included in the smartphone SP performs the object recognition process. The results of the recognition process are transmitted to the information presentation system through a network (e.g., short-range wirelesses network), and displayed on the display 300 included in the information presentation system. Note that the results of the recognition process may be information that indicates that a given object has been recognized, or may be the object information relating to the recognized object. According to this configuration, the information presentation system need not include the imaging section and the processing section that performs the recognition process, and the processing load of the information presentation system can be reduced, for example.

Note that the recognition process need not necessarily be performed by an electronic device (e.g., smartphone) that is carried by the user. For example, a server system or the like that is connected to the information presentation system through a network may perform the recognition process. Alternatively, a unit that includes the imaging section may transmit the captured image to a smartphone, and the smartphone may transmit the captured image to a server system. Specifically, the imaging section and the processing section that performs the recognition process may be provided to an arbitrary device, and various modifications may be made of the connection relationship between the devices.

3. RELATIONSHIP BETWEEN OBJECT RECOGNITION RANGE AND VIRTUAL IMAGE DISPLAY RANGE

The positional relationship (including the relationship in size) between the object recognition range and the virtual image display range is described below. The positional relationship between the object recognition range and the virtual image display range may be roughly classified into two patterns. Specifically, the positional relationship between the object recognition range and the virtual image display range may have a pattern in which the virtual image display range DA corresponds to part of the object recognition range OB (i.e., part of the peripheral area of the object recognition range OB) (see FIG. 3). In this case, an overlapping area OA and a non-overlapping area NA1 are set, the overlapping area OA being an area in which the virtual image display range DA is included within the object recognition range OB, and the non-overlapping area NA1 being an area that is included in the object recognition range OB, and does not include the virtual image display range DA.

Figure 4:
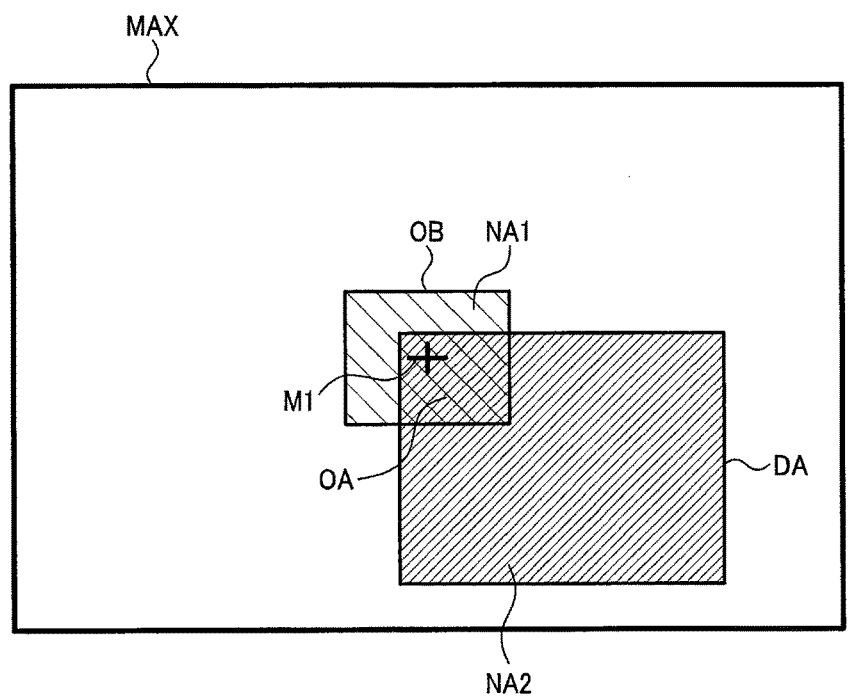
FIG. 4 illustrates another example of the positional relationship between an object recognition range and a virtual image display range.

The positional relationship between the object recognition range and the virtual image display range may also have a pattern in which the object recognition range OB and the virtual image display range DA do not have an inclusive relationship (see FIG. 4). In this case, the overlapping area OA, the non-overlapping area NA1, and a second non-overlapping area NA2 are set, the second non-overlapping area NA2 being an area that is included in the virtual image display range DA, and does not include the object recognition range OB.

3.1 First Relationship Example

Figure 3:
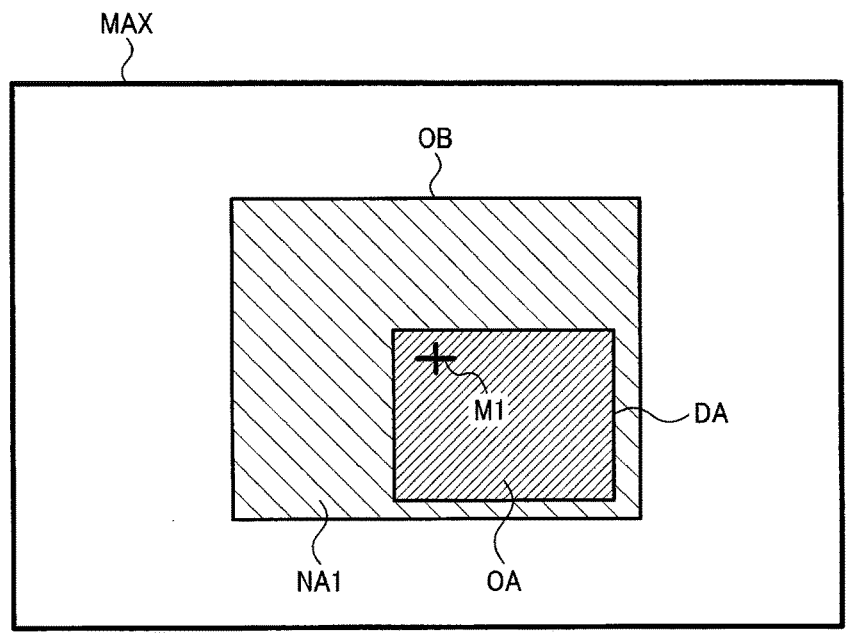
FIG. 3 illustrates an example of the positional relationship between an object recognition range and a virtual image display range.

The pattern illustrated in FIG. 3 is described below. In FIG. 3, the virtual image display range DA is included within the object recognition range OB (i.e., the overlapping area OA and the non-overlapping area NA1 are set). In this case, the object recognition process can be performed since the overlapping area OA is included within the object recognition range OB, and information can be displayed since the overlapping area OA is also included within the virtual image display range DA. Therefore, it is possible to notify the user of the position or the like of the object recognition range OB by displaying information that indicates the position of the object recognition range OB within the overlapping area OA.

The information displayed within the overlapping area OA may be a marker that indicates a reference position of the object recognition range OB (see FIG. 3). When the reference position is set to be the center position of the object recognition range OB, it is possible to notify the user that the object recognition range OB is a given range situated around the marker (center position marker M1). In this case, it is impossible to notify the user of the size of the object recognition range OB. However, it is possible to notify the user that the size of the object recognition range OB is large so that the frame of the object recognition range OB is not positioned within the overlapping area OA, as compared with an example in which the frame of the object recognition range OB is displayed (described later with reference to FIG. 4).

Note that it is not preferable that the center position of the virtual image display range DA be close to the center position of the object recognition range OB (i.e., the marker that indicates the center position of the object recognition range OB is displayed in the center area of the virtual image display range DA) taking account of the visibility of the object in the non-overlapping area NA1. The reasons therefor are described below with reference to FIGS. 5A and 5B.

Since the non-overlapping area NA1 is an area that is included within the object recognition range OB, but does not include the virtual image display range DA, the object situated within the non-overlapping area NA1 is subjected to the recognition process, and has high visibility since the object is not screened by an image. It is also necessary to take account of the shape of the non-overlapping area NA1 from the viewpoint of improving the visibility of the recognition target object.

Figure 5A:
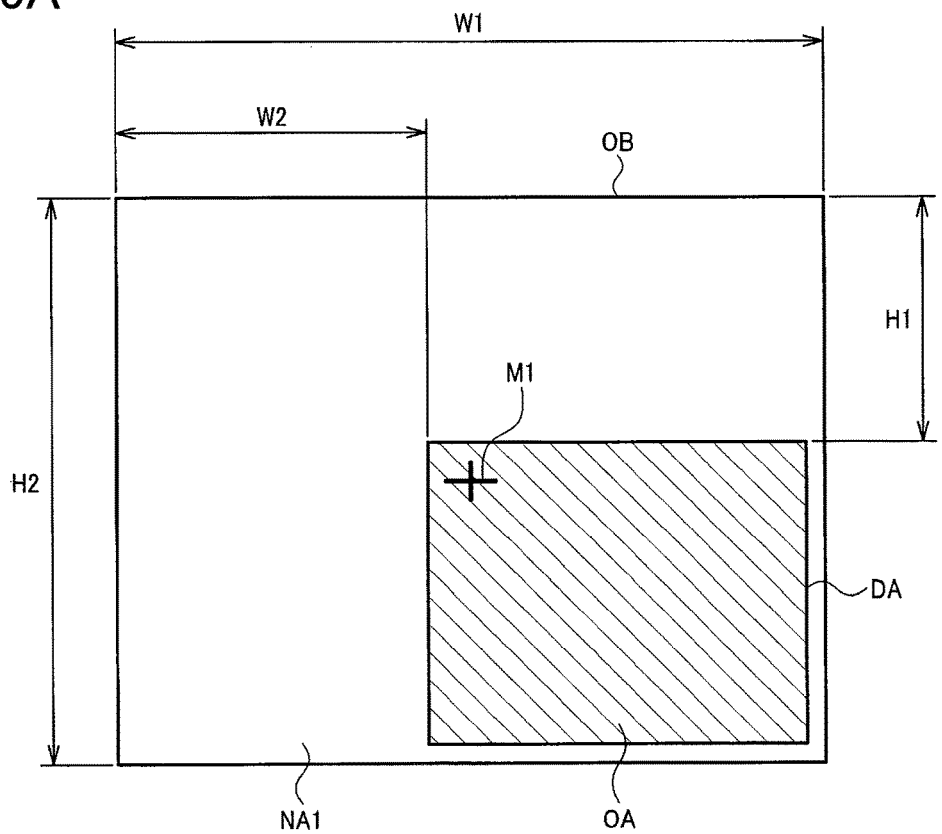
FIGS. 5A and 5B are views illustrating the difference in shape of a non-overlapping area depending on the positional relationship between an object recognition range and a virtual image display range.
Figure 5B:
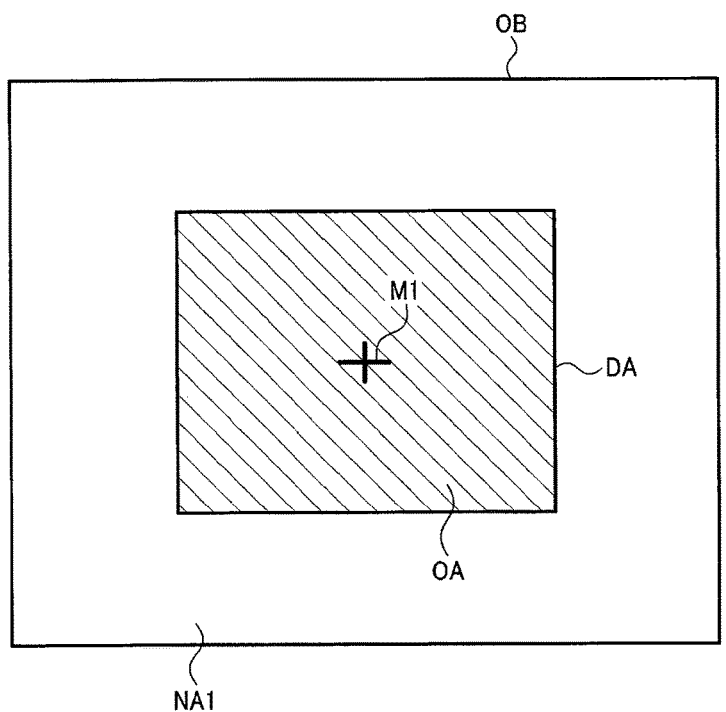

In FIGS. 5A and 5B, the non-overlapping area NA1 has an identical area. In FIG. 5A, the virtual image display range DA is positioned in the lower right part of the object recognition range OB, and the upper part and the left part of the object recognition range OB correspond to the non-overlapping area NA1. Therefore, an object that is observed within a range having a height of H1 and a width of W1, or an object that is observed within a range having a height of H2 and a width of W2, can be observed in its entirety without being screened by an image even when the entire object is subjected to the recognition process. Note that the height H1 and the like do not refer to the actual size of the object, but refer to the size of the object within the field of view. When the object recognition range OB and the virtual image display range DA have the positional relationship illustrated in FIG. 5A, it is likely that a wide range of the object can be observed even when part of the object is positioned outside a range having a height of H1 and a width of W1, or a range having a height of H2 and a width of W2.

In FIG. 5B, however, the non-overlapping area NA1 has a thin frame-like shape. Therefore, an object that is included within the object recognition range OB, and can be observed in its entirety without being screened by an image is limited to an object that is observed to have a very small size, or an object that has an elongated shape. Specifically, it is likely that a wide range of the recognition target object is screened by an image (i.e., a deterioration in visibility occurs).

Accordingly, it is preferable that the center position of the object recognition range OB be situated in the peripheral area of the virtual image display range DA. In this case, the center position marker M1 that indicates the center position of the object recognition range OB is displayed in the peripheral area of the virtual image display range DA.

3.2 Second Relationship Example

The pattern illustrated in FIG. 4 is described below. In the example illustrated in FIG. 4, the object recognition range OB and the virtual image display range DA overlap each other. Specifically, it is possible to set the overlapping area OA that includes the object recognition range OB and the virtual image display range DA, the non-overlapping area NA1 that includes the object recognition range OB, but does not include the virtual image display range DA, and the second non-overlapping area NA2 that includes the virtual image display range DA, but does not include the object recognition range OB.

The example illustrated in FIG. 4 differs from the example illustrated in FIG. 3 in that the frame of the object recognition range OB is included within the virtual image display range DA. Specifically, it is possible to display a frame marker M2 that indicates the outer edge of the object recognition range OB (see FIG. 6) in the example illustrated in FIG. 4 in addition to the marker that indicates the center position or the like of the object recognition range OB (see FIG. 3).

When both the center position marker M1 and the frame marker M2 as presented to the user (see FIG. 6), the user can accurately estimate the position and the size of the object recognition range OB (see the dotted line in FIG. 6) based on the center position marker M1 and the frame marker M2. When it suffices to determine an approximate position of the object recognition range OB, and it is unnecessary to uniquely determine the position and the size of the object recognition range OB, only one of the center position marker M1 and the frame marker M2 may be displayed instead of displaying both the center position marker M1 and the frame marker M2.

The example illustrated in FIG. 4 also differs from the example illustrated in FIG. 3 in that the second non-overlapping area NA2 is provided that includes the virtual image display range DA, but does not include the object recognition range OB. Since the second non-overlapping area NA2 includes the virtual image display range DA, information can be displayed in the second non-overlapping area NA2. Since the second non-overlapping area NA2 does not include the object recognition range OB, the recognition target object is not included in the second non-overlapping area NA2 (i.e., at least part of the recognition target object that is subjected to the recognition process is not included in the second non-overlapping area NA2). Specifically, it is considered that the visibility of the recognition target object is not affected to a large extent even when information is displayed in the second non-overlapping area NA2.

Therefore, information may be displayed in the second non-overlapping area NA2, and may not be displayed in the overlapping area OA instead of displaying information over the entire virtual image display range DA. Alternatively, information may also be displayed in the overlapping area OA, but may be preferentially displayed in the second non-overlapping area NA2 as compared with the overlapping area OA.

Figure 7:
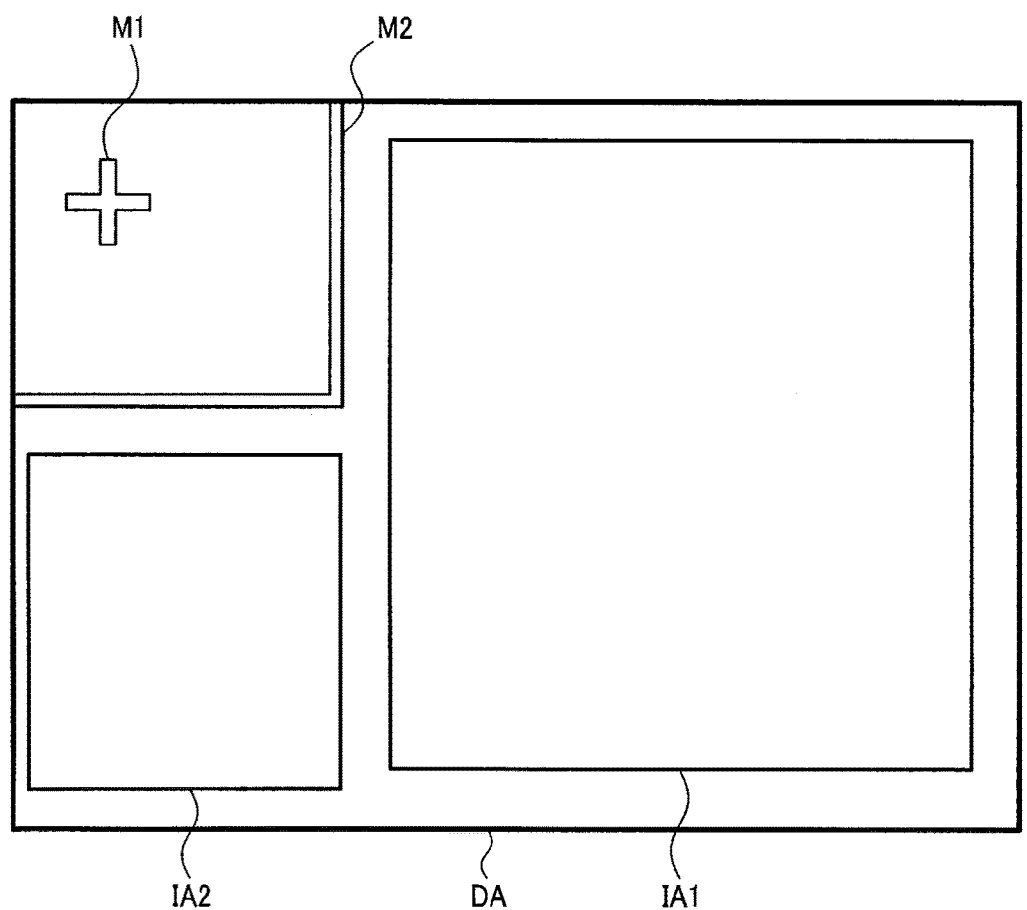
FIG. 7 illustrates an area division example of a display screen used to display information.

FIG. 7 illustrates a specific image display example. As illustrated in FIG. 7, the center position marker M1 and the frame marker M2 are displayed in the overlapping area OA that includes the virtual image display range DA without displaying information in the overlapping area OA (see the upper left part in FIG. 7). Information is displayed in the second non-overlapping area NA2 that is an area of the virtual image display range DA other than the overlapping area OA. This makes it possible to efficiently allow the user to determine the object recognition range OB by displaying the marker or the like in the virtual image display range DA, while preventing a situation in which the recognition target object is screened by an image, and the visibility of the recognition target object deteriorates.

In FIG. 7, the second non-overlapping area NA2 is divided into a detected object display area IA2 and an information display area IA1. Note that the detected object display area IA2 is an area in which approximate information (e.g., name and external appearance) of the object recognized by the recognition process is displayed, and the information display area IA1 is an area in which detailed information about the object is displayed. The detailed information about the object may be various types of information. For example, when the object is a home appliance, the detailed information about the object may be specification information (e.g., trade name, model number, manufacturer, and power consumption) about the home appliance, word-of-mouth information about the home appliance, or the like. Note that the image displayed in the second non-overlapping area NA2 is not limited to that illustrated in FIG. 7, and various modifications are possible.

4. TEXT RECOGNITION

Although an example in which the object is a home appliance or a packaged product has been described above, the object is not limited thereto. For example, the object may be a text, and a text recognition process may be performed as the object recognition process. In this case, a text can be recognized when the user looks at the text, and the meaning of the word included in the text can be displayed, or a text in a foreign language can be translated into a text in the user's native language, for example. Note that various techniques that recognize a text from an image including a text have been known, and an arbitrary technique among such techniques may be applied to one embodiment of the invention. Therefore, detailed description thereof is omitted. The positional relationship between the object recognition range OB and the virtual image display range DA, the marker displayed, and the like when implementing the text recognition process are described below.

Figure 8:
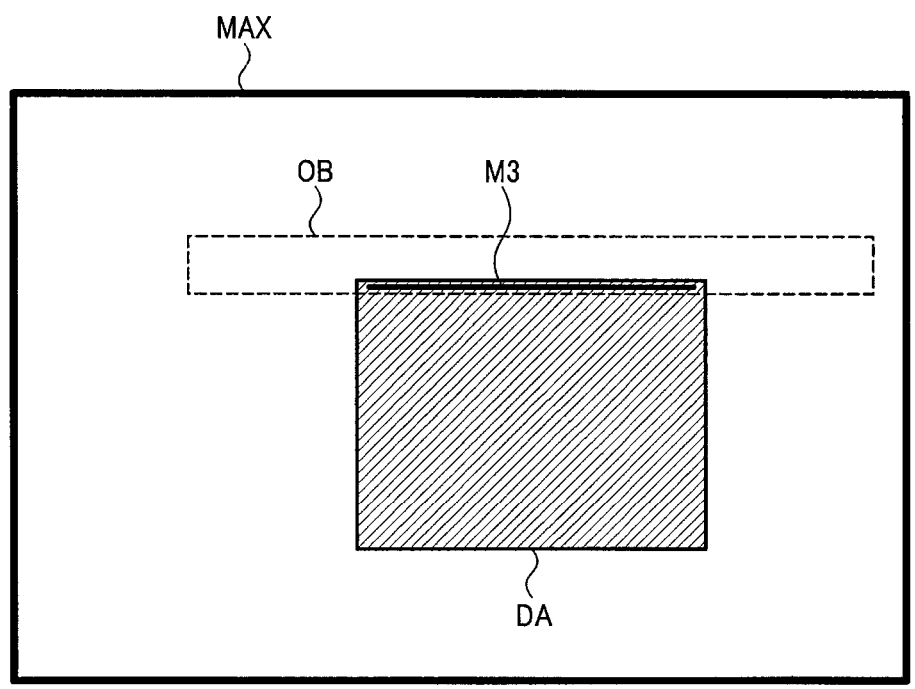
FIG. 8 illustrates an example of the positional relationship between an object recognition range and a virtual image display range when implementing a text recognition process.

FIG. 8 illustrates a specific example when implementing the text recognition process. In FIG. 8, an oblong text recognition range is set as the object recognition range OB. This is because the text recognition process is normally performed line by line. Note that the text recognition range may also be set corresponding to a plurality of lines. However, it is preferable to set the text recognition range corresponding to each line so that the translation target text range or the like desired for the user can be appropriately recognized.

In this case, since the text recognition range is set to extend in the direction along one side of the virtual image display range DA, a line marker M3 may be displayed along the one side of the virtual image display range DA (see FIG. 8). Note that the frame marker M2 that indicates the outer edge of the object recognition range OB may also be displayed (see FIG. 6). However, since the difference between the frame marker M2 and the line marker M3 is small when implementing the text recognition process (see FIG. 8), the frame marker M2 need not necessarily be displayed.

Information is displayed in the second non-overlapping area NA2 in the same manner as in FIG. 7. For example, the meaning of the recognized word or a translated text may be displayed in the second non-overlapping area NA2.

5. CHANGE IN SIZE AND THE LIKE OF OBJECT RECOGNITION RANGE

The size and/or the position of the object recognition range OB may be changed dynamically. The size and the position of the object recognition range OB are changed by the processing section 600 that performs the recognition process, for example.

Figures 9A, 9B:
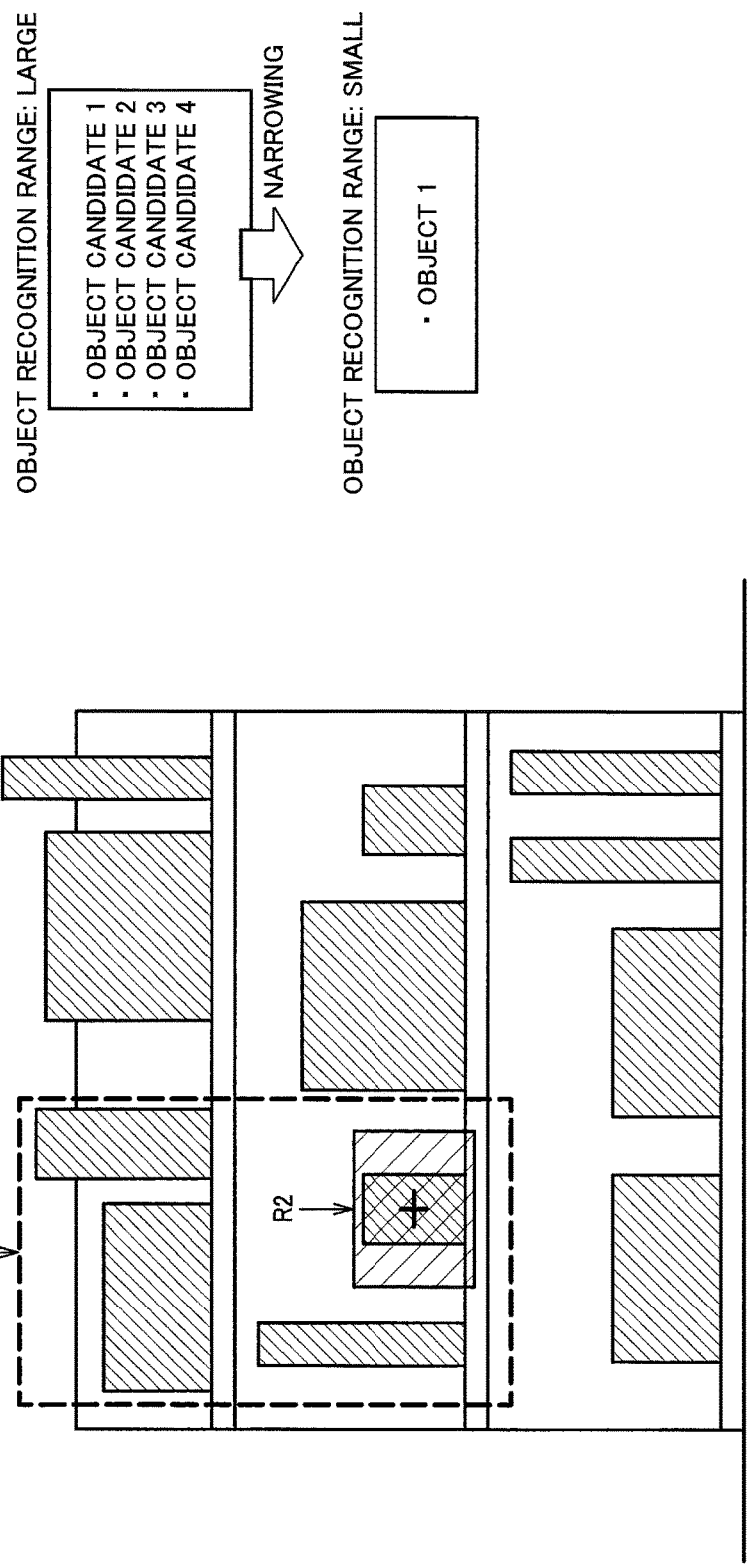
FIGS. 9A and 9B illustrate an example in which an object recognition range is set variably.

FIGS. 9A and 9B illustrate an example of a specific situation. FIG. 9A illustrates an example in which goods (objects) are displayed on a shelf. The range indicated by R1 is set as the object recognition range OB, and four object candidates are included in the object recognition range OB. In this case, if information about all of the four object candidates is displayed, it is likely that the amount of information is too much. For example, when the amount of information displayed at a time is large, the user may have to sort out the information. When the size of the display range (virtual image display range DA) of the information presentation system is limited (e.g., see-through HMD), it may be difficult to display a large amount of information at a time.

In such a situation, the priority may be determined for the plurality of object candidates, and the object candidate with the highest priority may be selected as the display target object, for example. One embodiment of the invention deal with such a situation by dynamically changing the size and/or the position of the object recognition range OB. Specifically, the size of the object recognition range OB is reduced when the number of objects recognized by the recognition process performed on the object recognition range OB is larger than a given threshold value (is equal to or larger than 2 in a narrow sense). In this case, the object recognition range OB may be changed (reduced) from the range R1 to a range R2. According to this configuration, since the number of objects included in the object recognition range (R2) can be reduced, it is possible to implement appropriate display. Specifically, it is possible to narrow the objects (see FIG. 9B) by changing the object recognition range OB from the large object recognition range R1 to the small object recognition range R2.

The object recognition range OB that has been changed in size and/or position may further be changed in size and/or position so that the object recognition range OB has the positional relationship illustrated in FIG. 3 or 4 with respect to the virtual image display range DA.

Figure 10:
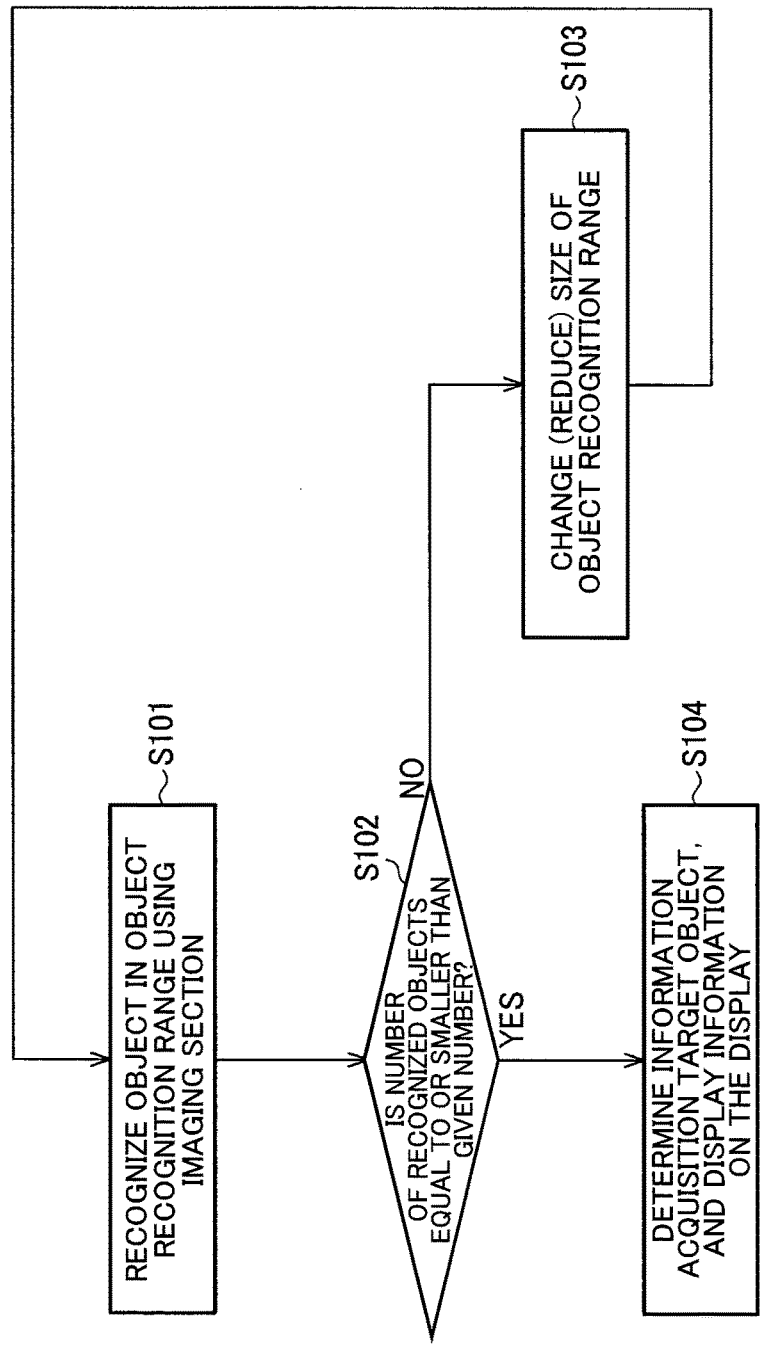
FIG. 10 is a flowchart illustrating a process that changes the size or the like of an object recognition range.

The size and/or the position of the object recognition range OB may be automatically changed based on the results of the recognition process, or may be changed based on an input performed by the user. FIG. 10 illustrates the flow of a process when the processing section 600 or the like automatically changes the size and/or the position of the object recognition range OB. In a step S101, the recognition process is performed on the object included in the object recognition range OB. Whether or not the number of recognized objects is equal to or smaller than a given number is determined (S102). When it has been determined that the number of recognized objects is larger than the given number, the size of the object recognition range OB is reduced (S103), and the recognition process is performed again on the object included in the object recognition range OB (step S101). When it has been determined in the step S102 that the number of recognized objects is equal to or smaller than the given number, information about the recognized object is acquired, and displayed on the display 300 (S104).

Figure 11A:
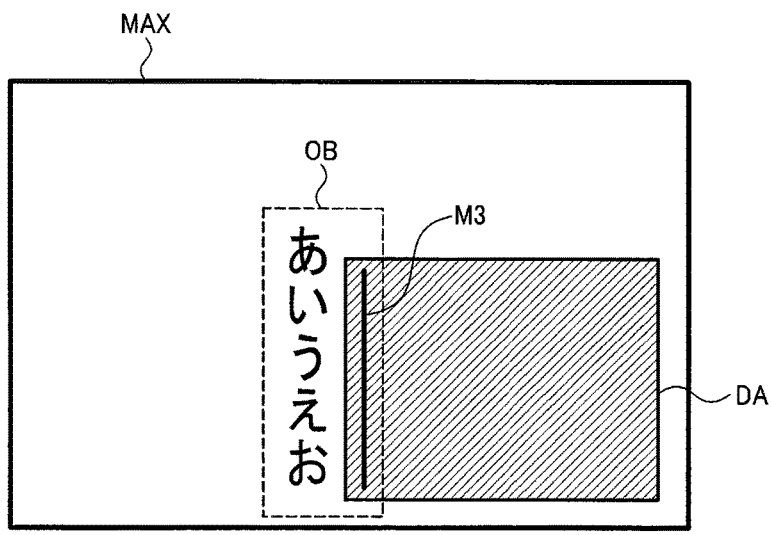
FIGS. 11A and 11B illustrate an example in which a text that is written vertically is recognized.

The size or the like of the object recognition range OB may be changed in various other ways. For example, when implementing the text recognition process described above with reference to FIG. 8, the size and/or the position of the text recognition range may be changed corresponding to whether the text is written vertically or horizontally. For example, a text in Japanese or the like can be written either vertically or horizontally. The text recognition range illustrated in FIG. 8 when the text is written horizontally. When the text is written vertically, a text recognition range that extends in the vertical direction may be set on the assumption that the recognition process is performed line by line. For example, the text recognition range may be set along one side of the virtual image display range DA that extends in the vertical direction when the text is written as illustrated in FIG. 11A, and the line marker M3 that extends in the vertical direction is displayed in the virtual image display range DA. A text in English or the like may also be written vertically (see FIG. 11B) in a diagram or the like. When a diagram or the like is fixed on a wall surface, or displayed on a display of a PC, it is impossible to recognize the text in the horizontal direction since it is difficult to rotate the diagram or the like. In such a case, the text recognition range may be set to extend in the vertical direction (see FIG. 11B).

The text recognition range may be changed based on an input (e.g., an input that instructs a vertical writing mode or a horizontal writing mode) performed by the user, or may be automatically changed (determined) based on the results of the recognition process. Various automatic determination techniques may be used. For example, a parsing technique or the like may be employed. A text does not make sense when a text that is written vertically is read horizontally, or a text that is written horizontally is read vertically. Therefore, it is possible to determine whether or not the text recognition method is correct by performing a known parsing process to determine whether or not the text is grammatically correct.

Figure 11B:
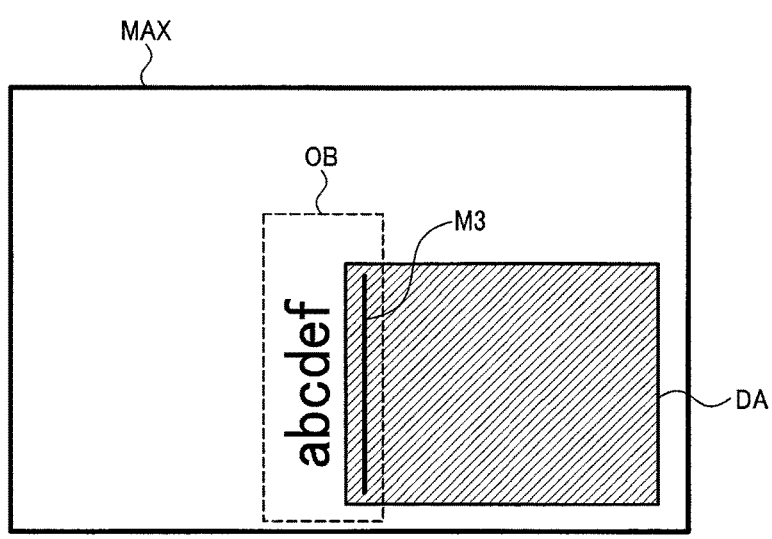

An example in which the size and/or the position of the object recognition range OB is changed, or the recognition direction of the text recognition process is changed, has been described above on the assumption that a transition between the object recognition mode and the text recognition process mode is implemented by an explicit input performed by the user. Note that the current mode may be automatically determined based on the results of the recognition process, and the size and/or the position of the object recognition range OB may be automatically changed according to the determined mode. For example, it is possible to estimate whether the user desires to recognize a text or desires to recognize an object other than a text based on the number of characters, the position, the size, and the like of the text included in the object recognition range OB (text recognition range). The text recognition range may be set as illustrated in FIG. 8, 11A, or 11B when it has been determined that the mode is the text recognition mode, and the object recognition range OB may be set as illustrated in FIG. 3, 4, or the like when it has been determined that the mode is the object recognition mode.

6. SPECIFIC EXAMPLE

According to the embodiments of the invention, the information presentation system includes the display 300 that displays an image within the field of view of the user as a virtual image so that the image can be observed by the user, and the display control section 400 that causes the display 300 to display information based on the captured image from the imaging section 100 that is equipped to the head of the user, and captures a range in the direction of the field of view of the user (see FIG. 1). When the object recognition range OB (i.e., a range in which the object is recognized) is set to part of the imaging range of the imaging section 100, the display 300 displays the virtual image in the virtual image display range DA, the virtual image display range DA having such a positional relationship with the object recognition range OB that at least part of the virtual image display range DA in which the virtual image is displayed overlaps part of the object recognition range OB.

The term "imaging range" used herein refers to an object range that can be captured by the imaging section 100 (see MAX in FIG. 3 and the like). The object recognition range OB refers to a range within the imaging range that is subjected to the object recognition process, and image processing for recognizing the object is performed on an area of the captured image that corresponds to the object recognition range OB. The imaging section 100 captures a range in the direction of the field of view of the user. Note that the angle of view (corresponding to the imaging range of the imaging section) of the imaging section 100 need not necessarily coincide with the actual field of view (angle of view) of the user.

The expression "such a positional relationship with the object recognition range OB that at least part of the virtual image display range DA in which the virtual image is displayed overlaps part of the object recognition range OB" may refer to a positional relationship in which part of the virtual image display range DA overlaps part of the object recognition range OB (see FIG. 4). The expression "such a positional relationship with the object recognition range OB that at least part of the virtual image display range DA in which the virtual image is displayed overlaps part of the object recognition range OB" may refer to a positional relationship in which the entirety of the virtual image display range DA overlaps (is included within) part of the object recognition range OB (see FIG. 3).

Specifically, when an area that includes the object recognition range OB and the virtual image display range DA is referred to as the overlapping area OA, and an area that includes the object recognition range OB, but does not include the virtual image display range DA is referred to as the non-overlapping area NA1, the display 300 displays the virtual image in the virtual image display range DA that has such a positional relationship with the object recognition range OB that both the overlapping area OA and the non-overlapping area NA1 are present.

In other words, the object recognition range OB includes the overlapping area OA that includes the virtual image display range DA, and the non-overlapping area NA1 that does not include the virtual image display range DA.

According to this configuration, since the object recognition range OB and the virtual image display range DA have the positional relationship illustrated in FIG. 3 or 4, it is possible to comprehensibly notify the user of the position and/or the size of the object recognition range OB with respect to the virtual image display range DA. Since the recognition target object that is observed within the non-overlapping area NA1 is not screened by the displayed image, it is possible to suppress a deterioration in the visibility of the object in which the user is interested.

When an area of the virtual image display range DA that overlaps part of the object recognition range OB is referred to as a first area, and an area of the virtual image display range DA that does not overlap the object recognition range OB is referred to as a second area, the display 300 may display information about the object recognized based on the object recognition range OB in an area of the image that corresponds to the second area.

Note that the first area corresponds to the overlapping area OA (see FIG. 4 and the like), and the second area corresponds to the second non-overlapping area NA2.

This makes it possible to display information in an appropriate area of the virtual image display range DA. The second area (second non-overlapping area NA2) refers to an area in which information can be displayed, and the object that is observed within the second area is not subjected to the recognition process. Therefore, no problem occurs even if the visibility of the object that is observed within the second area deteriorates due to information displayed in the second area, since it is considered that the object that is observed within the second area is not an object in which the user is interested. When a wide range of the object is included within the object recognition range, and a relatively narrow range of the object is included within the second non-overlapping area NA2, the object may be subjected to the recognition process. In such a case, the object that is subjected to the recognition process may be screened by the image displayed in the second non-overlapping area NA2. However, a major problem does not occur since the area of the object that is screened by the image does not affect the recognition process to a large extent.

The display 300 may display a marker in the virtual image display range DA, the marker notifying the user of the positional relationship between the object recognition range OB and the virtual image display range DA.

Specifically, the display 300 may display the center position marker M1 that indicates the center position of the object recognition range OB in the virtual image display range DA as the marker (see FIG. 3).

Figure 6:
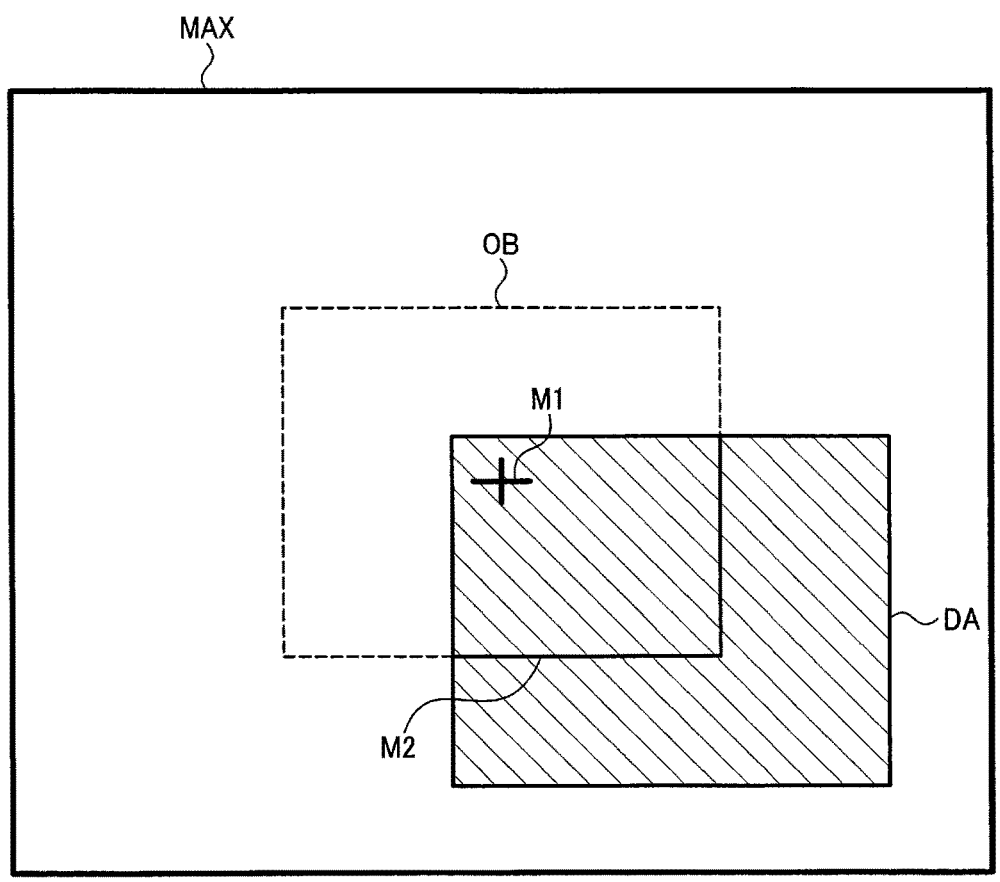
FIG. 6 illustrates a display example of a center position marker and a frame marker.

Alternatively, the display 300 may display the frame marker M2 that indicates part of the frame of the object recognition range OB in the virtual image display range DA as the marker (see FIG. 6).

When the object recognition range OB is set along one side of the virtual image display range DA, the display 300 may display the line marker M3 that extends linearly and indicates the position of the object recognition range OB in the virtual image display range DA as the marker (see FIG. 8).

The display 300 may display a plurality of markers among these markers in combination.

This makes it possible to comprehensibly notify the user of the positional relationship between the object recognition range OB and the virtual image display range DA utilizing various markers. Note that the marker is not limited to a marker by which the positional relationship can be uniquely determined, but may be a marker by which the positional relationship can be approximately estimated. For example, it is possible to accurately notify the user of the object recognition range OB by utilizing the center position marker M1 and the frame marker M2 in combination (see FIG. 6). Alternatively, one of the center position marker M1, the frame marker M2, and the line marker M3 may be displayed. In this case, it is difficult for the user to accurately specify the object recognition range OB. However, it is possible for the user to estimate the object recognition range OB.

The display 300 may display the center position marker M1 that indicates the center position of the object recognition range OB in the peripheral area of the virtual image display range DA.

Figure 12:
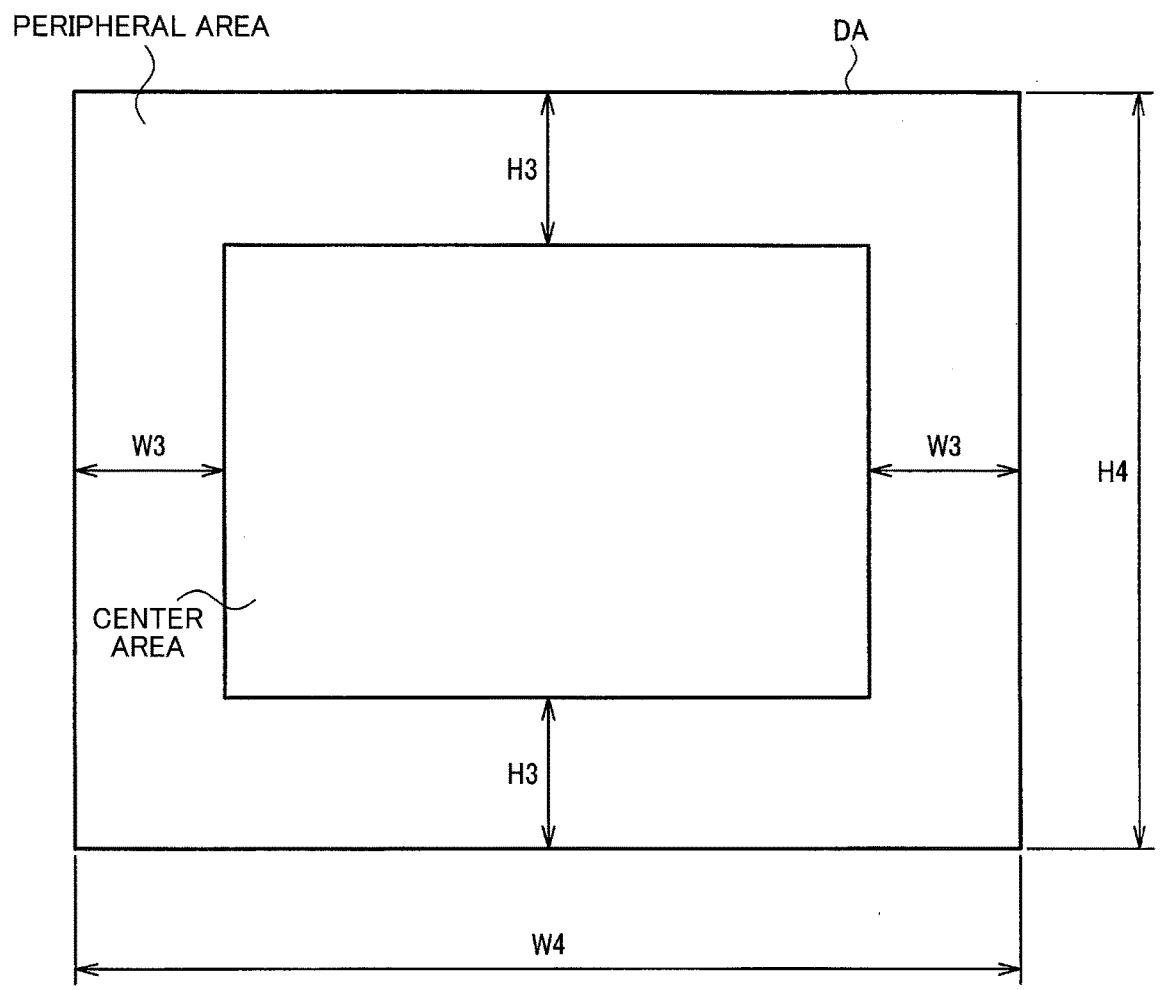
FIG. 12 is a view illustrating a peripheral area of a virtual image display range.

The peripheral area of the virtual image display range DA refers to an area that is situated from the outer edge of the virtual image display range DA to a position shifted from the outer edge of the virtual image display range DA toward the center of the virtual image display range DA by a given length (see FIG. 12), for example. More specifically, the peripheral area of the virtual image display range DA may be an area in which the dimensions H3, W3, H4, and W4 illustrated in FIG. 12 satisfy "H4/H3<Th" and "W4/W3<Th" (where, Th is a given threshold value). Although FIG. 12 illustrates an example in which the center area of the virtual image display range DA (i.e., an area other than the peripheral area) is rectangular, the configuration is not limited thereto. Various modifications may be made of the definition of the peripheral area, such as defining the center area of the virtual image display range DA to have a circular shape.

This configuration makes it possible to further suppress a deterioration in the degradation of the recognition target object as compared with the case where the center position marker M1 is displayed in the center area of the virtual image display range DA (i.e., the center position of the object recognition range OB is close to the center position of the virtual image display range DA). Specifically, a wide range of an object having a different shape and a different size can be observed without being screened by an image when the non-overlapping area NA1 has such a shape that the aspect ratio is relatively close to 1 as compared with the case where the non-overlapping area NA1 has a frame-like shape formed by combining elongated areas (see FIGS. 5A and 5B).

As illustrated in FIG. 1, the information presentation system may include the processing section 600 that sets the object recognition range OB. The processing section 600 may set the object recognition range OB based on information that indicates the position of the virtual image display range DA so that the object recognition range OB has such a positional relationship with the virtual image display range DA that at least part of the virtual image display range DA overlaps part of the object recognition range OB.

This makes it possible for the processing section 600 included in the information presentation system to set the object recognition range OB. For example, when the imaging section 100 and the display 300 are included in an identical wearable device (see FIG. 1), the relationship between the imaging range (maximum detection range) of the imaging section 100 and the virtual image display range DA of the display 300 may be known in advance. When the position of the display 300 can be changed by operating the frame illustrated in FIG. 1, for example, the relationship between the imaging range and the virtual image display range DA can be determined by detecting the operation amount of the frame or the like. Therefore, the position and the size of the object recognition range OB can be set based on the position and the size of the virtual image display range DA. Specifically, since information about an area of the captured image that corresponds to the virtual image display range DA is provided, the processing section 600 may set the positional relationship between the area of the captured image that corresponds to the virtual image display range DA and the area subjected to the recognition process.

As described above with reference to FIG. 2, the object recognition range OB need not necessarily be set by a wearable device that functions as the information presentation system. For example, a processing section included in a portable electronic device (e.g., smartphone) that is connected to the wearable device through a network, or a processing section included in a server system may set the object recognition range OB. Specifically, the information presentation system according to the embodiments of the invention corresponds to the wearable device WE illustrated in FIG. 2 in a narrow sense, but may be a system that includes the wearable device WE, the imaging section CA, and an electronic device (e.g., smartphone SP) that includes a processing section.

The processing section 600 may variably set at least one of the position and the size of the object recognition range OB.

This makes it possible to flexibly set the object recognition range OB. As illustrated in FIGS. 3 and 4, the positional relationship in which at least part of the virtual image display range DA overlaps part of the object recognition range OB is not uniquely determined (i.e., various patterns may be conceived). Therefore, a given positional relationship may be suitable for object recognition and information display, but another positional relationship may be unsuitable for object recognition and information display depending on the situation of the object observed within the external field of view, for example. It is possible to appropriately set the object recognition range OB by setting the object recognition range OB to be variable corresponding to the situation. Note that arbitrary information may be used as a trigger that changes the object recognition range OB, and the position and the size of the object recognition range OB may be determined in various ways. For example, information input by the user may be used, or the processing section 600 may automatically make a determination using the results of the recognition process.

The processing section 600 may set the size of the object recognition range OB to be smaller than the size of the object recognition range OB during the recognition process when the number of objects recognized by the recognition process performed on the object recognition range OB is larger than a given threshold value.

This makes it possible to narrow the objects by changing the object recognition range OB from the range R1 to the range R2 (see FIGS. 9A and 9B) when the number of objects recognized within the object recognition range R1 is too large. As a result, the object for which information is to be displayed can be limited, and information can be appropriately displayed. Specifically, the user's understanding is facilitated by limiting the amount of information displayed at a time, or visibility is improved by increasing the size of each character, for example.

When the object is a text, the display 300 may display information relating to the text recognized as the object, or information obtained by translating the text in the virtual image display range DA.

This makes it possible to recognizes a text as the object, and display information relating to the text, or information obtained by translating the text (see FIG. 8, for example). The information relating to the text may be information that indicates the dictionary meaning of a word included in the text, or may be information that indicates the search results obtained by performing a search process using the text as keywords, or may be another information.

The embodiments of the invention may also be applied to a method for controlling an information presentation system (method for controlling a wearable device) that is configured so that the imaging section 100 captures a range in the direction of the field of view of the user, and the display 300 displays an image within the field of view of the user as a virtual image so that the image can be observed by the user, the image including information based on the captured image acquired from the imaging section 100, when the object recognition range OB (i.e., a range in which the object is recognized) is set to part of the imaging range of the imaging section 100, the method including displaying the virtual image in the virtual image display range DA, the virtual image display range DA having such a positional relationship with the object recognition range OB that at least part of the virtual image display range DA in which the virtual image is displayed overlaps part of the object recognition range OB.

The information presentation system and the like according to the embodiments of the invention may include a processor and a memory. The processor may be a central processing unit (CPU), for example. Note that the processor is not limited to a CPU. Various processors such as a graphics processing unit (GPU) and a digital signal processor (DSP) may also be used. The processor may be a hardware circuit that includes an application-specific integrated circuit (ASIC). The memory stores a computer-readable instruction. Each section of the information presentation system and the like according to the embodiments of the invention is implemented by causing the processor to execute the instruction. The memory may be a semiconductor memory (e.g., SRAM or DRAM), a register, a hard disk, or the like. The instruction may be an instruction included in an instruction set of a program, or may be an instruction that causes a hardware circuit of the processor to operate.

Although only some embodiments of the present invention have been described in detail above, those skilled in the art will readily appreciate that many modifications are possible in the embodiments without materially departing from the novel teachings and advantages of the invention. Accordingly, all such modifications are intended to be included within scope of the invention. Any term cited with a different term having a broader meaning or the same meaning at least once in the specification and the drawings can be replaced by the different term in any place in the specification and the drawings. The configuration and the operation of the information presentation system and the like are not limited to those described in connection with the above embodiments. Various modifications and variations may be made of the above embodiments as to the configuration and the operation of the information presentation system and the like.

What is claimed is:

1. An information presentation system comprising:
a display configured to display a virtual image to a user,
wherein the virtual image is generated from information about a recognized object,
wherein the recognized object is within an object recognition range within an imaging range of a captured image acquired by an imaging sensor, and
wherein the imaging range of the imaging sensor corresponds to an actual field of view of the user; and
a display controller configured to control the display to display the virtual image within a virtual image display range of the display, wherein the virtual image display range is smaller than the imaging range,
wherein the display controller is configured to:
set the virtual image display range in advance at a first specific position within the imaging range;
set the object recognition range in advance at a second specific position within the imaging range, wherein the virtual image display range and the object recognition range have a given positional relationship; and
control the display to display a marker within an overlapping area of the virtual image display range and the object recognition range, and
wherein the display controller is configured to control the display to display the virtual image in a non-overlapping area of the virtual image display range that does not overlap with the object recognition range.

2. The information presentation system according to claim 1,
wherein the marker indicates a positional relationship between the object recognition range and the virtual image display range.

3. The information presentation system according to claim 2, wherein the display controller is configured to control the display to display a center position marker in the virtual image display range as the marker, wherein the center position marker indicates a center position of the object recognition range.

4. The information presentation system according to claim 3,
wherein the display controller is configured to control the display to display the center position marker that indicates the center position of the object recognition range in a peripheral area of the virtual image display range as the marker.

5. The information presentation system according to claim 2,
wherein the display controller is configured to control the display to display a frame marker in the virtual image display range as the marker, wherein the frame marker indicates part of a frame of the object recognition range.

6. The information presentation system according to claim 2,
wherein in response to the object recognition range being set along one side of the virtual image display range, the display controller is configured to control the display to display a line marker in the virtual image display range as the marker, wherein the line marker extends linearly, and indicates a position of the object recognition range.

7. The information presentation system according to claim 1, further comprising:
a processor comprising hardware, wherein the processor is configured to set the object recognition range based on information that indicates the first specific position of the virtual image display range so that of the virtual image display range overlaps with the object recognition range in the overlapping area and the non-overlapping area of the virtual image display range does not overlap with the object recognition range.

8. The information presentation system according to claim 7,
wherein the processor is configured to variably set at least one of the second specific position and a size of the object recognition range.

9. The information presentation system according to claim 8,
wherein in response to a determination that a number of objects recognized in a recognition process performed in a first object recognition range of a first size is larger than a given threshold value, the processor is configured to set a second object recognition range of a second size smaller than the first size.

10. The information presentation system according to claim 1,
wherein in response to the recognized object being a text, the display controller is configured to display at least one of:
information relating to the text; and
information obtained by translating the text,
in the virtual image display range.

11. The information presentation system according to claim 1,
wherein the display controller is configured to control the display to display the virtual image in the non-overlapping area of the virtual image display range that does not overlap with the object recognition range, in response to a portion of a frame of the object recognition range being within the virtual image display range.

12. A method for controlling a display,
wherein the display is configured to display a virtual image to a user,
wherein the virtual image is generated from information about a recognized object,
wherein the recognized object is within an object recognition range within an imaging range of a captured image acquired by an imaging sensor, and
wherein the imaging range of the imaging sensor corresponds to an actual field of view of the user, and
wherein the method comprises:
controlling the display to display the virtual image within a virtual image display range of the display, wherein the virtual image display range is smaller than the imaging range,
setting the virtual image display range in advance at a first specific position within the imaging range;
setting the object recognition range in advance at a second specific position within the imaging range, wherein the virtual image display range and the object recognition range have a given positional relationship;
controlling the display to display a marker within an overlapping area of the virtual image display range and the object recognition range; and
controlling the display to display the virtual image in a non-overlapping area of the virtual image display range that does not overlap with the object recognition range.

13. The method according to claim 12,
wherein the marker indicates a positional relationship between the object recognition range and the virtual image display range.

14. The method according to claim 12, further comprising:
setting the object recognition range based on information that indicates the first specific position of the virtual image display range so that the virtual image display range overlaps with the object recognition range in the overlapping area and the non-overlapping area of the virtual image display range does not overlap with the object recognition range.

15. The method according to claim 12,
wherein the controlling the display to display the virtual image in the non-overlapping area of the virtual image display range that does not overlap with the object recognition range is performed in response to a portion of a frame of the object recognition range being within the virtual image display range.

16. A computer-readable storage device storing instructions for controlling a display to display a virtual image to a user,
wherein the virtual image is generated from information about a recognized object,
wherein the recognized object is within an object recognition range within an imaging range of a captured image acquired by an imaging sensor, and
wherein the imaging range of the imaging sensor corresponds to an actual field of view of the user, and
wherein the instructions, when executed by a processor, cause the processor to:
control the display to display the virtual image within a virtual image display range of the display, wherein the virtual image display range is smaller than the imaging range,
set the virtual image display range in advance at a first specific position within the imaging range;

set the object recognition range in advance at a second specific position within the imaging range, wherein the virtual image display range and the object recognition range have a given positional relationship;

control the display to display a marker within an overlapping area of the virtual image display range and the object recognition range; and control the display to display the virtual image in a non-overlapping area of the virtual image display range that does not overlap with the object recognition range.

17. The computer-readable storage device according to claim 16, wherein the marker indicates a positional relationship between the object recognition range and the virtual image display range.

18. The computer-readable storage device according to claim 16, wherein the instructions, when executed by the processor, cause the processor to:

set the object recognition range based on information that indicates the first specific position of the virtual image display range so that the virtual image display range overlaps with the object recognition range in the overlapping area and the non-overlapping area of the virtual image display range does not overlap with the object recognition range.

19. The computer-readable storage device according to claim 16, wherein the instructions, when executed by the processor, cause the processor to:

control the display to display the virtual image in the non-overlapping area of the virtual image display range that does not overlap with the object recognition range, in response to a portion of a frame of the object recognition range being within the virtual image display range.

20. An information presentation system comprising:

a display configured to display a virtual image to a user, wherein the virtual image is generated from information about a recognized object, wherein the recognized object is within an object recognition range within an imaging range of a captured image acquired by an imaging sensor, and wherein the imaging range of the imaging sensor corresponds to an actual field of view of the user; and a display controller configured to control the display to display the virtual image within a virtual image display range of the display, wherein the virtual image display range is smaller than the imaging range, wherein in response to a first area of the virtual image display range overlapping with at least a part of the object recognition range, the display controller is configured to control the display to display the virtual image in a second area of the virtual image display range that does not overlap with the object recognition range, and wherein the display controller is configured to control the display to display the virtual image in the second area of the virtual image display range that does not overlap with the object recognition range, in response to a portion of a frame of the object recognition range being within the virtual image display range.

21. The information presentation system according to claim 20, wherein the display controller is configured to control the display to display a frame marker indicating the portion of the frame of the object recognition range within the virtual image display range.

22. A method for controlling a display, wherein the display is configured to display a virtual image to a user, wherein the virtual image is generated from information about a recognized object, wherein the recognized object is within an object recognition range within an imaging range of a captured image acquired by an imaging sensor, and wherein the imaging range of the imaging sensor corresponds to an actual field of view of the user, and wherein the method comprises:

controlling the display to display the virtual image within a virtual image display range of the display, wherein the virtual image display range is smaller than the imaging range, wherein in response to a first area of the virtual image display range overlapping with at least a part of the object recognition range, controlling the display to display the virtual image in a second area of the virtual image display range that does not overlap with the object recognition range, and wherein the controlling the display to display the virtual image in the second area of the virtual image display range that does not overlap with the object recognition range is performed in response to a portion of a frame of the object recognition range being within the virtual image display range.

23. The method according to claim 22, further comprising:

controlling the display to display a frame marker indicating the portion of the frame of the object recognition range within the virtual image display range.

24. A computer-readable storage device storing instructions for controlling a display to display a virtual image to a user, wherein the virtual image is generated from information about a recognized object, wherein the recognized object is within an object recognition range within an imaging range of a captured image acquired by an imaging sensor, and wherein the imaging range of the imaging sensor corresponds to an actual field of view of the user, and wherein the instructions, when executed by a processor, cause the processor to:

control the display to display the virtual image within a virtual image display range of the display, wherein the virtual image display range is smaller than the imaging range, in response to a first area of the virtual image display range overlapping with at least a part of the object recognition range, control the display to display the virtual image in a second area of the virtual image display range that does not overlap with the object recognition range, and control the display to display the virtual image in the second area of the virtual image display range that does not overlap with the object recognition range, in response to a portion of a frame of the object recognition range being within the virtual image display range.

25. The computer-readable storage device according to claim 24, wherein the instructions, when executed by the processor, cause the processor to:

control the display to display a frame marker indicating the portion of the frame of the object recognition range within the virtual image display range.

\* \* \* \* \*